Patented Sept. 1, 1925.

1,551,824

UNITED STATES PATENT OFFICE.

BIRGER FJELD HALVORSEN AND ØYSTEIN RAVNER, OF CHRISTIANIA, NORWAY, ASSIGNORS TO NORSK HYDRO-ELEKTRISK KVAELSTOFAKTIESELSKAB, OF SOLLIGATEN 7, CHRISTIANIA, NORWAY.

PROCESS FOR THE PRODUCTION OF A FERTILIZER CONTAINING POTASSIUM AND NITROGEN.

No Drawing. Application filed June 25, 1923. Serial No. 647,743.

*To all whom it may concern:*

Be it known that we, BIRGER FJELD HALVORSEN and ØYSTEIN RAVNER, citizens of the Kingdom of Norway, both residing at Christiania, in the Kingdom of Norway, have invented certain new and useful Improvements in Processes for the Production of a Fertilizer Containing Potassium and Nitrogen, of which the following is a specification.

In order to produce fertilizers that contain both potassium and nitrogen, potassic and nitrogenous manures are mixed together, for, with the exception of nitrate of potassium, there is no product that contains a sufficient quantity of these ingredients. Nitrate of potassium, on account of its comparatively high cost, can hardly be used to any great extent as a fertilizer.

According to the present invention a fertilizer containing potassium and nitrogen can be produced by using potassic rock which is easily decomposed and nitric acid, whereby a product can be straightaway obtained that is dry, easily pulverized and easy to strew. The use of leucite and rock containing leucite has proved specially advantageous as it can easily be decomposed in nitric acid and it produces a non-hygroscopic fertilizer.

For instance, if using a leucite containing 18 per cent potassium calculated as $K_2O$ (100 parts by weight) and decomposing it with nitric acid of 60 per cent (173 parts by weight), the solution, when cooled, will become solidified and will contain about 6.6 per cent of potassium calculated as $K_2O$ and 8.2 per cent of nitrogen. A less concentrated nitric acid can also be employed. Nitric acid of 45 per cent (222 parts by weight) will produce a dry product suitable for strewing and containing about 5.6 per cent of potassium calculated as $K_2O$ and about 7 per cent of nitrogen. If, instead of using concentrated leucite, raw material containing about 11 per cent of potassium calculated as $K_2O$ (100 parts by weight) is employed with acid of 60 per cent (120 parts by weight), a product containing about 5 per cent of potassium calculated as $K_2O$ and 6.2 per cent of nitrogen is obtained. When using acid of 45 per cent (162 parts by weight) and unconcentrated leucite, a product is acquired that contains about 4.2 per cent of potassium calculated as $K_2O$ and about 5.2 per cent of nitrogen.

The process is very simply performed, finely pulverized rock being added to the necessary quantity of acid, while the latter is being stirred. The solution is then emptied into solidifying chambers where, when the reaction is at an end, it stiffens into hard substance.

In order to increase the content of potassium and nitrogen in the substance, it may, with advantage, be subjected to a drying process. The substance will yield water as a large part of the water in the nitric acid is partly combined with the silicic acid that has been separated in the form of a colloid, and is partly crystal water. When lying pulverized in the air the substance will gradually dry by itself. The drying process can, however, be quickened by means of artificial heating. In order to enrich the substance in nitrogen and to avoid any loss of nitric acid during storage, ammonia gas may advantageously be introduced into it. Ammonia gas will then precipitate the trivalent metals forming the ammonium nitrate and hydroxides. Such a product can also be mixed, without fear of a reversion of the phosphoric acid, with phosphoric fertilizers.

In order to produce a more highly concentrated potassic and nitrogenous fertilizer the solidified substance can be heated to about 300° whereby, for instance, nitrate of aluminium and of iron are separated. By means of lixiviating the remaining substance and by crystallization, a pure nitrate of potassium can be obtained.

We claim:

1. Process for the direct production of a fertilizer containing potassium and nitrogen consisting in mixing together easily decomposable potassic rock and nitric acid, the latter of such a concentration and in such a substantial but limited quantity that after the reaction a solid substance is obtained that can be pulverized.

2. Process for the direct production of a fertilizer containing potassium and nitrogen consisting in the mixing together of rock containing leucite with nitric acid, the latter of such a concentration and in such a substantial but limited quantity that after the reaction a solid substance that can be pulverized is obtained.

3. Process for the direct production of a fertilizer containing potassium and nitrogen consisting in mixing together easily decomposable potassic rock and nitric acid the latter of such a concentration and in such a substantial but limited quantity that after the reaction a solid substance is obtained that can be pulverized, and drying the substance at a high temperature.

4. Process for the direct production of a fertilizer containing potassium and nitrogen consisting in mixing together easily decomposable potassic rock and nitric acid the latter of such a concentration and in such a substantial but limited quantity that after the reaction a solid substance is obtained that can be pulverized, and drying the substance in the presence of ammonia gas.

5. Process for the direct production of a fertilizer containing potassium and nitrogen consisting in mixing together easily decomposable potassic rock and nitric acid the latter of such a concentration and in such a substantial but limited quantity that after the reaction a solid substance is obtained that can be pulverized and drying the substance at a temperature of about 300°, thus decomposing nitrate of aluminium and lixiviating the nitrate of potassium.

In testimony whereof, we affix our signatures.

BIRGER FJELD HALVORSEN.
ØYSTEIN RAVNER.